(12) United States Patent
Clymer et al.

(10) Patent No.: US 6,433,533 B1
(45) Date of Patent: Aug. 13, 2002

(54) GIANT MAGNETO-IMPEDANCE(GMI) SPIN RATE SENSOR

(75) Inventors: Mark L. Clymer, Mystic; Glenn R. Graves, Oakdale, both of CT (US)

(73) Assignee: Sardis Technologies LLC, Mystic, CT (US)

( * ) Notice: Subject to any disclaimer, the term of this patent is extended or adjusted under 35 U.S.C. 154(b) by 0 days.

(21) Appl. No.: 09/518,651

(22) Filed: Mar. 3, 2000

Related U.S. Application Data

(60) Provisional application No. 60/122,522, filed on Mar. 3, 1999.

(51) Int. Cl.[7] .............................. G01P 3/48; G01P 3/489; G01C 21/10
(52) U.S. Cl. ........................ 324/166; 324/160; 324/171; 324/249; 327/24.1
(58) Field of Search .................................. 324/160, 163, 324/166, 171, 173, 174, 176, 244, 249, 260, 207.13, 207.21, 207.25; 244/3.1, 3.21, 3.23, 1 R; 377/24.1

(56) References Cited

U.S. PATENT DOCUMENTS

| | | | | |
|---|---|---|---|---|
| 3,297,948 A | * | 1/1967 | Kohler | ........................ 324/173 |
| 4,426,048 A | * | 1/1984 | Mildren | ..................... 244/3.23 |
| 5,497,704 A | * | 3/1996 | Kurschner et al. | |
| 6,137,411 A | * | 10/2000 | Tyren | |
| 6,229,307 B1 | * | 5/2001 | Umehara et al. | ........... 324/249 |
| 6,232,775 B1 | * | 5/2001 | Naitoh et al. | ............... 324/249 |
| 6,295,931 B1 | * | 10/2001 | Cutler et al. | |

FOREIGN PATENT DOCUMENTS

DE        199 53 190 A1 * 5/2001

* cited by examiner

Primary Examiner—Gerard S. Strecker
(74) Attorney, Agent, or Firm—McCormick, Paulding & Huber LLP

(57) ABSTRACT

A GMI sensor for determining spin rate of a rotating body within an external magnetic field is presented. The sensor comprises an oscillator generating an AC drive signal at an oscillator output terminal. A voltage divider circuit includes a first terminal AC coupled to the oscillator output terminal through a coupling capacitor, and a second terminal electrically connected to a reference ground. The voltage divider circuit further includes a GMI fiber having a GMI junction terminal. The fiber is disposed in fixed relation to the rotating body such that impedance of the fiber is modulated by the external magnetic field to provide a modulated drive signal at the GMI junction terminal. A signal processing circuit is electrically connected to the GMI junction terminal to processes the modulated drive signal and provide an output signal indicative of the spin rate of the rotating body.

20 Claims, 1 Drawing Sheet

GIANT MAGNETO-IMPEDANCE(GMI) SPIN RATE SENSOR

This application claims priority to provisional application Ser. No. 60/122,522 to Mark Clymer and Glenn Graves, entitled Giant Magneto-Impedance (GMN) Spin Rate Sensor, filed Mar. 3, 1999.

FIELD OF THE INVENTION

The present invention relates generally to sensors. More specifically, the present invention relates to a sensor for determining spin rate of a rotating body within an external magnetic field.

BACKGROUND OF THE INVENTION

In military applications, it is generally agreed that the number of revolutions that a spinning projectile makes is an accurate indicator of its range. The distance that a projectile will travel linearly per revolution is a constant. Theoretical analysis shows that a "perfect" spin counting fuse will measure the range of a projectile better than a "perfect" time counting fuse. Variations in muzzle velocity will not affect the ranging of a spin counter because distance is now calculated independently from velocity.

The advantages of developing and implementing a spin counting fuse are several. The fuse would be inherently more accurate than an electronic timing (ET) fuse. The fire control system would not need to adjust the fuse setting to account for round-to-round velocity deviations. This will simplify the system by eliminating those components in the fire control and the weapon that measure and correct for differences in projectile speed. The overall benefit is a cheaper, and more reliable system.

A prior art method of determining spin rate is the use of magnetically-sensitive coils to sense the earth's magnetic fields. As the coil rotates about the projectile's spin axis, the sensor responds to the earth's magnetic flux density to count rotations of the projectile. A drawback of this approach is the size of the coils needed for certain applications where the sensor needs to count spins onboard a very slow turning projectile, such as the KE anti-tank round. Coil sensors are speed sensitive, i.e., the slower the speed the more coil windings are required. Therefore the coils must become larger for slower speeds, effectively precluding the use of these sensors in smaller caliber rounds.

There is a need therefore, for an improved method of determining the spin rate of a rotating body within an external magnetic field, e.g. a magnetic field of the earth.

SUMMARY OF THE INVENTION

The present invention offers advantages and alternatives over the prior art by providing a sensor using the phenomenon of giant magneto-impedance (GMI) to determine the spin rate of a rotating body, such as an artillery shell, in an external magnetic field, such as the magnetic field of the earth. The present invention eliminates the need for the fire control system of a weapon to account for round to round velocity deviations. Moreover, by eliminating the use of speed sensitive coils, the present invention may be used on slower traveling, smaller caliber rounds which was not possible with prior art sensors.

These and other advantages are accomplished in an exemplary embodiment of the invention by providing a GMI sensor for determining spin rate of a rotating body within an external magnetic field. The sensor comprises an oscillator generating an alternating current (AC) drive signal at an oscillator output terminal, a voltage divider circuit and a signal processing circuit. The voltage divider circuit electrically connects the drive signal to a reference ground by providing a first terminal AC coupled to the oscillator output terminal through a coupling capacitor, and a second terminal electrically connected to the reference ground. The voltage divider circuit further includes a GMI fiber having a GMI junction terminal. The fiber is disposed in fixed relation to the rotating body such that impedance of the fiber is modulated by the external magnetic field to provide a modulated, e.g., amplitude modulated, drive signal at the GMI junction terminal. The signal processing circuit is electrically connected to the GMI junction terminal and processes the modulated drive signal to provide an output signal indicative of the spin rate of the rotating body.

In an alternate of the invention, the signal processing circuit further comprises a rectifier having an input terminal in series connection with the GMI junction terminal and a low pass filter in series connection with an output terminal of the rectifier. The signal processing circuit rectifies and filters out the drive signal to provide a data signal at the output terminal of the rectifier. The output terminal of the rectifier, i.e., the data signal, is electrically connected to either of an inverting and non-inverting terminal of an amplifier circuit. A reference voltage circuit generates a reference voltage which dynamically tracks amplitude variations in the drive signal due to outside factors such as temperature. The reference voltage is electrically connected to the other of the inverting and non-inverting terminal of the amplifier circuit. The data signal is amplified by the amplifier circuit to provide the output signal.

DETAILED DESCRIPTION OF THE PREFERRED EMBODIMENT

Figure 1:
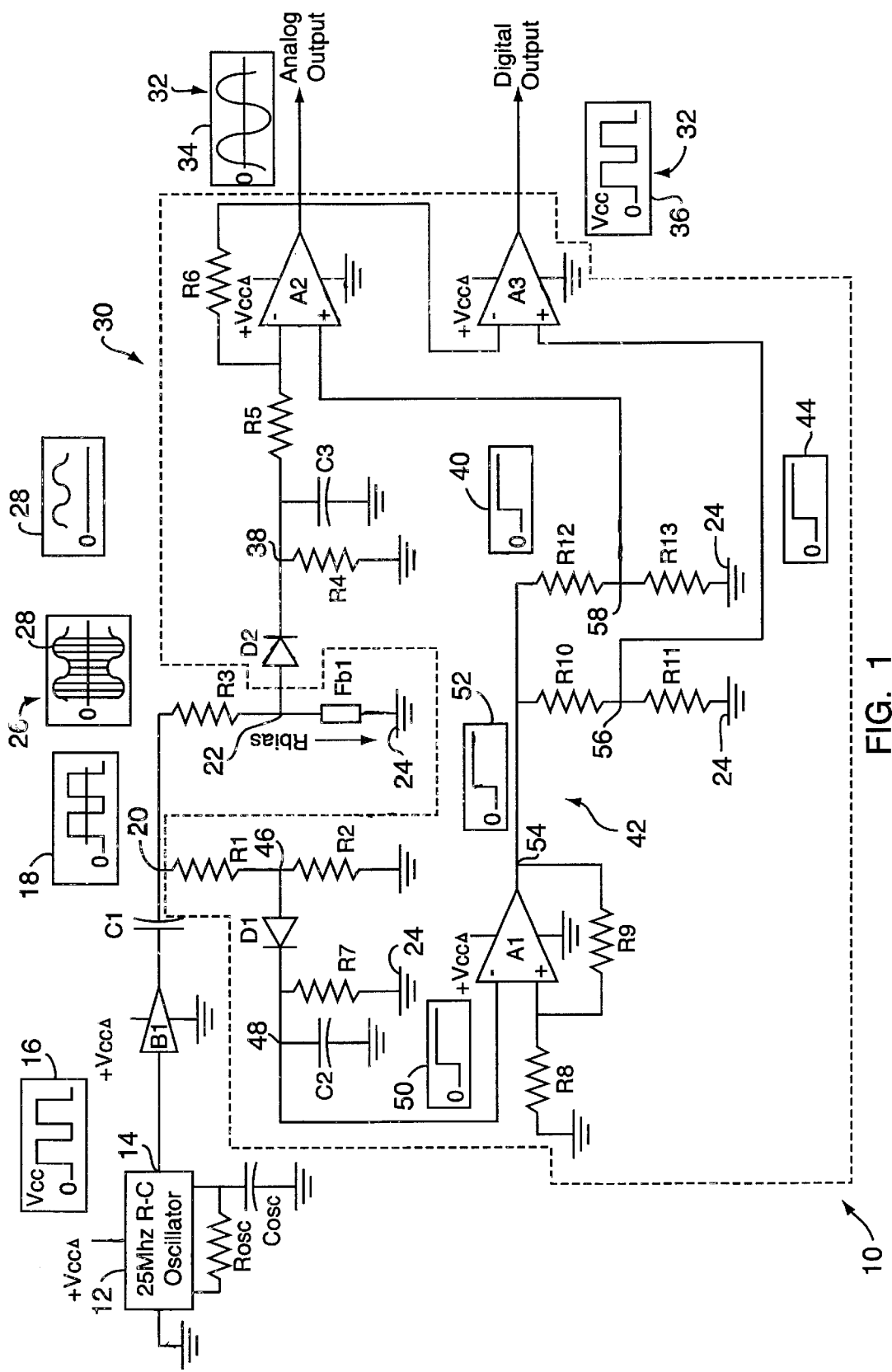
FIG. 1 is a schematic diagram of a GMI sensor in accordance with the present invention.

The present invention was designed using the phenomenon of giant magneto-impedance (GMI), which is known and found in fibers comprised of materials having a high magnetic permeability, e.g. cobalt-rich amorphous fibers. In the present invention a sensor having a GMI fiber is utilized to determine the spin rate of a rotating body, such as an artillery shell, in the earth's magnetic field. Magneto-impedance occurs in a GMI fiber when an AC current is applied and the amplitude of the induced voltage between the ends of the fiber modulates with an external magnetic field applied parallel to the fiber axis. The amplitude modulations are due to the impedance change created by the applied magnetic field. Impedance is defined as a measure of the response of an electric circuit to an alternating current.

For example, a small high-frequency current of approximately 24 MHz is applied through a fiber having a diameter of 5 $\mu$m, and a length of approximately 5 mm, which generates a fiber impedance with resistive and inductive components due to the skin effect and the circumferential field. The skin effect is defined as a nonuniform distribution of electric current over the cross-section of a conductor when carrying an alternating current. The current density is greater at the surface of the conductor than at its center. This is due to electromagnetic (inductive) effects and becomes more pronounced as the frequency of the current is increased. The amplitude of induced voltage between the ends of the fiber changes for an external small DC field, such as is caused by the earth's magnetic field, e.g., applied in parallel with the fiber axis. This is similar to an impedance magnetometer which is used for measuring local variations of a magnetic field by measurement of the change in impedance of a nickel-iron wire of high permeability. The change in impedance is caused by the axial component of the field in which the wire is placed. The current is opposed by the capacitance and inductance of the circuit in addition to the resistance. The total opposition to current flow is the impedance, which is given by the ratio of the voltage to the current in the circuit.

Referring to FIG. 1, an embodiment of a GMI sensor for determining spin rate of a rotating body, e.g., an artillery round, within an external magnetic field, e.g., the magnetic field of the earth, in accordance with the invention is shown generally at 10. The GMI sensor 10 is driven by an R-C TTL buffered oscillator 12 which generates a 25 Mhz AC drive signal 16 at an oscillator output terminal 14. One skilled in the art would recognize that the oscillator configured with resistor Rosc and capacitor Cosc as shown, would. typically generate a square wave drive signal 16 between 0 and +Vcc (typically 5 volts). The drive signal 16 is buffered by buffer B1, and AC coupled to junction 20 through capacitor C1 to provide a pure AC drive signal 18 with all DC bias removed.

Resistor R3 and GMI fiber Fb1 are connected at GMI junction 22 to form a voltage divider circuit across junction 20 to the reference ground 24 The GMI fiber Fb1 is biased with a permanent magnet (not shown) along the length of the fiber to provide sensing polarity. The GMI fiber Fb1 is disposed in fixed relation to the rotating body (not shown) such that impedance of the fiber Fb1 is modulated by the external magnetic field (not shown) to provide an amplitude modulated drive signal 26 at GMI junction terminal 22. The amplitude modulations define a data signal 28 with a frequency indicative of the spin rate of the rotating body.

A signal processing circuit 30 (shown within dotted lines) is electrically connected to the GMI junction 22. The signal processing circuit 30 processes the modulated drive signal 26 to provide an output signal 32 indicative of the spin rate of the rotating body. In this exemplary embodiment the output signal 32 includes an analog signal 34 and a digital signal 36 both with frequencies substantially equal to the spin rate of the rotating body.

The signal processor circuit 30 includes a diode D2 with its cathode end electrically connected to GMI junction 22 and its anode end, i.e., output terminal, electrically connected to junction 38. Resistor R4 and Capacitor C3 are in parallel connection across junction 38 and the reference ground 24 to function as a low pass filter. The signal processing circuit 30 rectifies and filters out the high frequency drive signal 16 to provide the data signal 28 at junction 38.

Junction 38 and the data signal 28 are electrically connected to the inverting input of amplifier A2 through resistor R3. The non-inverting input of amplifier A2 is electrically connected to a DC offset voltage 40 generated from a reference voltage circuit 42 of signal processing circuit 30. The DC offset voltage 40 DC biases (offset) data signal 28, while resistors R3 and R6 are configured to amplify data signal 28 to provide the analog output signal 34 at the output of amplifier A2.

The A2 output terminal, i.e., the analog output signal 34, is electrically connected to the non-inverting input of comparator A3. The inverting input of A3 is electrically connected to a threshold switching voltage 44, also generated from the reference voltage circuit 42. The output of A3 generates the digital output signal 36 which switches from Vcc to reference ground 24 and back, whenever the analog signal 34 at the non-inverting input crosses the threshold switching voltage 44 at the inverting input of A3.

The reference voltage circuit 42 includes resistors R1 and R2 connected at junction 46 to form a second voltage divider circuit across junction 20 to reference ground 24. Diode D1 is electrically connected to junction 46 at its cathode end, i.e., input terminal, and its anode end, i.e., output terminal, is electrically connected to junction 48. Resistor R7 and capacitor C2 are in parallel connection across junction 48 and the reference ground 24 to function as a second low pass filter. The reference voltage circuit 42 rectifies and filters out the high frequency drive signal 16 to provide a DC voltage level 50 at junction 48. Junction 48 is electrically connected to the non-inverting input of amplifier A1. The inverting input of A1 is in turn connected to resistors R8 and R9 which are configured to provide an amplified DC level 52 at the A1 output terminal 54.

Resistors R10 and R11 are connected at junction 56 and resistors R12 and R13 are connected at junction 58 to form a pair of voltage dividers across the A1 output terminal 54 to reference ground 24. The DC level 52 is scaled down by the R10/R11 and the R12/R13 voltage divider circuits to respectively provide the threshold switching voltage 44 at junction 56 and the DC offset voltage 40 at junction 58.

Since the threshold switching voltage 44 and the DC offset voltage 40 are derived from the oscillator drive path, they are dynamic reference voltage levels. These dynamic reference levels help maintain signal switch point and output tracking as the oscillator output varies and impedances change with outside factors such as temperature and humidity.

Field vector variations caused by the sensor 10 spinning will amplitude modulate the drive signal 16 from the GMI junction 22. With the drive signal 16 filtered off, the low frequency data signal 28 is amplified by the DC coupled amplifier A2. The output of A2 provides the analog output signal 34, which is the input data for the comparator A3. The comparator A3 compares the analog output signal 34 to the threshold switching voltage 44 (dynamic reference voltage) and switches the digital output signal 36 high and low as the magnetic field input changes during rotation.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A GMI sensor for determining spin rate of a rotating body within an external magnetic field, the sensor comprising;

an oscillator generating an AC drive signal at an oscillator output terminal;

a first voltage divider circuit having,
  a first terminal AC coupled to the oscillator output terminal through a coupling capacitor,
  a second terminal electrically connected to a reference ground, and
  a GMI fiber connected between the first and second terminals and having a GMI junction terminal, the fiber disposed in fixed relation to the rotating body such that the fiber rotates with the body and an impedance generated within the fiber is modulated by an external magnetic field to provide a modulated drive signal at the GMI junction terminal; and a signal processing circuit electrically connected to the GMI junction terminal, the signal processing circuit processing the modulated drive signal to provide an output signal indicative of the spin rate of the rotating body.

2. The GMI sensor of claim 1, wherein the modulated drive signal further comprises amplitude modulations defining a data signal with a frequency indicative of spin rate.

3. The GMI sensor of claim 2, wherein the signal processing circuit further comprises:
   a rectifier having an input terminal in series connection with the GMI junction terminal; and
   a low pass filter in series connection with an output terminal of the rectifier, the signal processing circuit rectifying and filtering out the drive signal to provide the data signal at a first filter output terminal of the low pass filter.

4. The GMI sensor of claim 2, wherein the signal processing circuit further comprises:
   an amplifier circuit, the data signal electrically connected to one of an inverting and non-inverting terminal of the amplifier circuit, and
   a reference voltage circuit for generating a reference voltage which dynamically tracks amplitude variations in the drive signal, the reference voltage being in electrical communication with the other of the inverting and non-inverting terminals of the amplifier circuit.

5. The GMI sensor of claim 4, wherein:
   the amplifier circuit further comprises an amplifier having the data signal electrically connected to the inverting terminal of the amplifier;
   the reference voltage further includes a DC offset voltage in electrical communication with the non-inverting terminal of the amplifier; and
   an analog output signal generated at an output terminal of the amplifier.

6. The GMI sensor of claim 4, wherein:
   the amplifier circuit further comprises a comparator having the data signal electrically connected to the non-inverting terminal of the comparator;
   the reference voltage further comprises threshold switching voltage in electrical communication with the inverting terminal of the comparator; and
   the output signal further comprises a digital output signal generated at an output terminal of the comparitor.

7. The GMI sensor of claim 5, wherein:
   the amplifier circuit further comprises a comparator having the output terminal of the amplifier electrically connected to the non-inverting terminal of the comparator;
   the reference voltage further comprises a threshold switching voltage in electrical communication with the inverting terminal of the comparator; and
   the output signal further comprises a digital output signal generated at an output terminal of the comparitor.

8. The GMI sensor of claim 4, wherein the reference voltage circuit further comprises:
   a second voltage divider circuit including,
     a first resistor having a first terminal AC coupled to the oscillator output terminal through the coupling capacitor,
     a second resistor having a second terminal electrically connected to the reference ground and a first junction terminal connected in series with the first resistor to provide a drive signal with a scaled amplitude at the first junction terminal;
   a second rectifier having an input terminal connected in series with the first junction terminal;
   a second low pass filter in series connection with an output terminal of the second rectifier, the second rectifier and second low pass filter providing a DC voltage level at the output terminal of the second rectifier which tracks variations in amplitude of the drive signal.

9. The GMI sensor of claim 8, wherein the reference voltage circuit further comprises a second amplifier having a non-inverting terminal electrically connected to the output terminal of the second rectifier to provide an amplified DC voltage level at an output terminal of the second amplifier.

10. The GMI sensor of claim 9, wherein the reference voltage circuit further comprises a third voltage divider across the output terminal of the third amplifier and the reference ground, the third voltage divider including:
    a first resistor having a first terminal electrically connected to the second amplifier output terminal,
    a second resistor having a second terminal electrically connected to the reference ground and a second junction terminal connected in series with the first resistor to provide the reference voltage at the second junction terminal.

11. The GMI sensor of claim 3, wherein the rectifier further comprises a diode having a cathode in series connection to the GMI junction terminal and an anode in series connection to the low pass filter.

12. The GMI sensor of claim 3, wherein the low pass filter further comprises a resistor and capacitor in parallel connection across the output terminal of the rectifier and the reference ground.

13. The GMI sensor of claim 8, wherein the second rectifier further comprises a diode having a cathode in series connection to the second junction terminal and an anode in series connection to the second low pass filter.

14. The GMI sensor of claim 8, wherein the second low pass filter further comprises a resistor and capacitor in parallel connection across the output terminal of the second rectifier and the reference ground.

15. The GMI sensor of claim 1, wherein the external magnetic field further comprises the earth's magnetic field.

16. The sensor of claim 1, wherein the rotating body further comprises a military artillery round.

17. The sensor of claim 1, wherein the oscillating output terminal is connected to the coupling capacitor through a buffer.

18. The sensor of claim 1, wherein the GMI fiber further includes a permanent magnet disposed along the length of the fiber to provide sensing polarity.

19. The sensor of claim 1, wherein the first voltage divider circuit further comprises a resistor in series connection across the first terminal and the GMI junction terminal, and the GMI fiber in series connection across the GMI junction terminal and the second terminal.

20. A GMI sensor for determining spin rate of a rotating body within an external magnetic field, the sensor comprising;
    an oscillator generating an AC drive signal at an oscillator output terminal;
    a GMI fiber having a GMI junction terminal AC coupled to the oscillator output terminal and a second terminal electrically connected to a reference ground, the fiber disposed in fixed relation to the rotating body such that the fiber rotates with the body and an impedance generated within the fiber is modulated by an external magnetic field to provide a modulated drive signal at the GMI junction terminal; and a signal processing circuit electrically connected to the GMI junction terminal, the signal processing circuit processing the modulated drive signal to provide an output signal indicative of the spin rate of the rotating body.

* * * * *